US008472697B2

(12) United States Patent
Shimura

(10) Patent No.: US 8,472,697 B2
(45) Date of Patent: *Jun. 25, 2013

(54) METHOD AND APPARATUS FOR VISUAL INSPECTION

(75) Inventor: Kei Shimura, Mito (JP)

(73) Assignee: Hitachi High-Technologies Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/354,097

(22) Filed: Jan. 19, 2012

(65) Prior Publication Data
US 2012/0114222 A1 May 10, 2012

Related U.S. Application Data

(63) Continuation of application No. 11/489,472, filed on Jul. 20, 2006, now Pat. No. 8,131,058.

(30) Foreign Application Priority Data

Jul. 22, 2005 (JP) ................................ 2005-212978

(51) Int. Cl.
G06K 9/00 (2006.01)
(52) U.S. Cl.
USPC ................ 382/149; 716/52; 716/112; 702/35
(58) Field of Classification Search
USPC ......................... 382/149; 716/52, 112; 702/35
See application file for complete search history.

(56) References Cited

U.S. PATENT DOCUMENTS

| 4,581,762 | A | | 4/1986 | Lapidus et al. |
| 4,972,493 | A | | 11/1990 | Chemaly |
| 5,012,524 | A | | 4/1991 | Le Beau |
| 5,537,669 | A | * | 7/1996 | Evans et al. ................... 382/141 |
| 6,087,673 | A | * | 7/2000 | Shishido et al. .......... 250/559.45 |

(Continued)

FOREIGN PATENT DOCUMENTS

| JP | 59-073758 | 4/1984 |
| JP | 61-212708 A | 9/1986 |

(Continued)

OTHER PUBLICATIONS

Entire Prosecution of U.S. Appl. No. 11/289,472, filed Jul. 20, 2006 (now US Patent 8,131,058 issued Mar. 6, 2012 to Shimura) entitled "Method and Apparatus for Visual Inspection".

(Continued)

Primary Examiner — John Strege
(74) Attorney, Agent, or Firm — McDermott Will & Emery LLP

(57) ABSTRACT

In the case of die-to-die comparison, threshold processing units process the differential image between the image of a sample chip and the images of left and right adjacent chips using a second threshold value lower than a first threshold value thereby to determine a defect candidate for the sample chip. Further, threshold processing units process the differential image using the first threshold value. The defect candidates which develops a signal not smaller than the first threshold is detected as a defect. Also in the cell-to-cell comparison, the differential image is first processed by the second threshold value to determine a defect candidate, and the differential image is further processed by the first threshold value. The defect candidates which develops a signal not smaller than the first threshold value is detected as a defect.

3 Claims, 3 Drawing Sheets

U.S. PATENT DOCUMENTS

| | | | |
|---|---|---|---|
| 6,693,278 B2 * | 2/2004 | Maas et al. | 250/310 |
| 6,903,769 B1 * | 6/2005 | Wang et al. | 348/246 |
| 7,436,993 B2 * | 10/2008 | Onishi et al. | 382/149 |
| 7,598,490 B2 * | 10/2009 | Kurihara et al. | 250/307 |
| 8,126,259 B2 | 2/2012 | Shimura | |
| 8,131,058 B2 | 3/2012 | Shimura | |
| 2005/0094862 A1 * | 5/2005 | Shimura | 382/141 |

FOREIGN PATENT DOCUMENTS

| | | |
|---|---|---|
| JP | 2-170279 A | 7/1990 |
| JP | 05-108800 | 4/1993 |
| JP | 2005-106725 A | 4/2005 |

OTHER PUBLICATIONS

Entire Prosecution of U.S. Appl. No. 12/755,596, filed Apr. 7, 2010 (now US Patent 8,126,259 issued Feb. 28, 2012 to Shimura) entitled "Method and Apparatus for Visual Inspection".

* cited by examiner

METHOD AND APPARATUS FOR VISUAL INSPECTION

RELATED APPLICATIONS

This application is a Continuation of U.S. application Ser. No. 11/489,472, filed on Jul. 20, 2006, now U.S. Pat. No. 8,131,058, claiming priority of Japanese Patent Application No. 2005-212978, filed on Jul. 22, 2005, the entire contents of each of which are hereby incorporated by reference.

BACKGROUND OF THE INVENTION

This invention relates to a method and an apparatus for inspection of a defect of an object to be inspected, or in particular to a defect inspection method and an inspection apparatus used to check for pattern defects and foreign particles in the fabrication process of a semiconductor wafer, a photomask and a printed board.

For inspection of a semiconductor chip, a method is known in which images of a semiconductor chips formed repeatedly on a wafer are acquired by scanning a surface of the wafer and images of two adjacent chips are compared with each other (die-to-die comparison) to detect a defect. On the other hand, in the case where a pattern is repeated with a short period such as in a memory cell, a method is known in which an image is displaced by an amount equal to a integer multiple of the repetition period and compared with the original one (cell-to-cell comparison) to detect a defect. A specific method of defect detection in public domain is described in JP-A-61-212708, in which two images of adjacent chips or an image displaced by an amount equal to an integer multiple of the repetition period and the image before displacement are set in position, the difference therebetween is taken and the resulting differential image is processed with a threshold value. With regard to the die-to-die comparison, a method is known as disclosed in JP-A-2-170279 in which three images are compared to specify a defective chip. In this method, the image of a chip to be inspected is compared with the images of two adjacent chips and determined as defective only in the case where comparison with the images of both right and left chips reveals a difference more than a threshold value.

In the defect inspection method for a semiconductor chip in which three images are compared to specify a defective chip by die-to-die comparison, the image of the chip to be inspected is compared with the images of immediately adjacent chips and only in the case where comparison with the images of both the right and left adjacent chips shows a difference exceeding a threshold value, a defective chip can be specified.

In the case where the signal level of the defective part of the differential image is slightly higher than the threshold value, however, the random phenomenon such as the noise component contained in the images or the stage vibration may result in a situation where comparison with the image of the right chip produces a difference exceeding the threshold value while no such difference is obtained by comparison with the image of the left chip. Such a situation poses the problem that a defective chip cannot be specified and the particular difference cannot be detected as a defect. Also, a defect may or may not be detected by the effect of the random phenomenon while at the same time posing the problem that the stability of defect detection cannot be secured.

In the inspection method by cell-to-cell comparison, on the other hand, a single actual defect produces two peaks in the differential image. Therefore, only in the case where both peaks exceed the threshold value, the peaks are determined to be a defect to avoid erroneous noise detection. In the case where the signal level of the defective part of the differential image is slightly higher than the threshold value, however, the random noise component contained in the image poses the problem that one of the peak levels fails to exceed the threshold value and no defect can be detected.

SUMMARY OF THE INVENTION

The object of this invention is to detect a defect in stable fashion even in the case where the signal level of the defective part of the differential image exceeds the threshold value only slightly.

According to this invention, at least two threshold values are used for inspection. A threshold value lower than a first threshold value by a predetermined percentage is set as a second threshold value. For die-to-die comparison, the differential images between the image of the chip to be inspected and the images of the left and right chips are processed by the second threshold value thereby to determine defect candidates of the chips to be inspected. Further, the differential images between the image of the chip to be inspected and the images of the left and right chips are processed by the first threshold value. Among the defect candidates determined by the processing using the second threshold value, the candidates having a difference signal not lower than the first threshold value in at least one of the differential images are detected as defects. In similar fashion, for cell-to-cell comparison, the differential images are first processed using the second threshold value to determine defect candidates, and also the differential images are processed by the first threshold value. Further, among the defect candidates determined by the processing with the second threshold value, the candidates having a difference signal not lower than the first threshold value in at least one of the two peaks are detected as defects.

Specifically, according to a first aspect of the invention, there is provided a defect inspection method comprising the step of acquiring images of three different points on an object to be inspected (hereinafter sometimes referred to simply as an object), formed with an equivalent pattern, the first processing step for processing the difference between the first and second images with a first threshold value, the second processing step for processing the difference between the first and second images with a second threshold value lower than the first threshold value, the third processing step for processing the difference between the second and third images with the first threshold value, the fourth processing step for processing the difference between the second and third images with the second threshold value, the step of determining pixels exceeding the second threshold value in both the second and fourth processing steps as defect candidates, and the step of determining pixels among the candidates exceeding the first threshold value in at least one of the first and third processing steps as defects.

According to a second aspect of the invention, there is provided a defect inspection method comprising the steps of generating a second image displaced from a first image of the object having a periodical structure by an amount equal to an integer multiple of the period of the periodical structure, producing the difference between the first and second images, processing it with a second threshold value, determining a defect candidate in the case where the differential image has two peak points exceeding the second threshold value at the same interval as the distance displaced, and determining, as a defect, the pixel in the first image corresponding to as a defect candidate of which at least one of the two peaks exceeds the first threshold value higher than the second threshold value.

According to a third aspect of the invention, there is provided an inspection apparatus comprising an image data acquisition unit for acquiring the image data of an object to be inspected, a first processing unit for processing the difference between the first and second images acquired by the image data acquisition unit with a first threshold value, a second processing unit for processing the difference between the first and second images with a second threshold value lower than the first threshold value, a third processing unit for processing the difference between the second and third images acquired by the image data acquisition unit with the first threshold value, a fourth processing unit for processing the second and third images with the second threshold value, a defect candidate determining unit for determining a pixel exceeding the second threshold value in both the second and fourth processing units as a defect candidate, and a defect detection unit for determining a pixel exceeding the first threshold value in at least one of the first and third processing units as a defect among the pixels determined as defect candidates by the defect candidate determining unit.

According to a fourth aspect of the invention, there is provided an inspection apparatus comprising an image data acquisition unit for acquiring the image data of an object to be inspected, an image generating unit for generating a second image displaced from a first image of the object acquired in the image data acquisition unit, by an amount equal to an integer multiple of the period of the periodical structure of the object, a processing unit for processing the differential image between the first and second images by a second threshold value, a defect candidate determining unit for determining a defect candidate in the case where two peak points exceeding the second threshold value appear on the differential image at the same interval as the distance of displacement, and a defect detection unit for detecting the pixel of the first image corresponding to the particular peak as a defect in the case where at least one of the two peaks corresponding to a defect candidate exceeds a first threshold value higher than the second threshold value.

According to this invention, the inspection by die-to-die comparison can be stabilized by processing with the second threshold value, when the signal of at least one of the differential image with the images of the left and right chips adjacent to the object chip containing a defective part is reduced by noise or the like. Further, by adding the processing with the first threshold value to the processing with the second threshold value, the inspection substantially less sensitive to the noise is realized as compared with the conventional inspection method using the second threshold value alone. The inspection by cell-to-cell comparison is also expected to produce a similar effect.

Other objects, features and advantages of the invention will become apparent from the following description of the embodiments of the invention taken in conjunction with the accompanying drawings.

DESCRIPTION OF THE INVENTION

Embodiments of the invention are described below with reference to the drawings.

Figure 1:
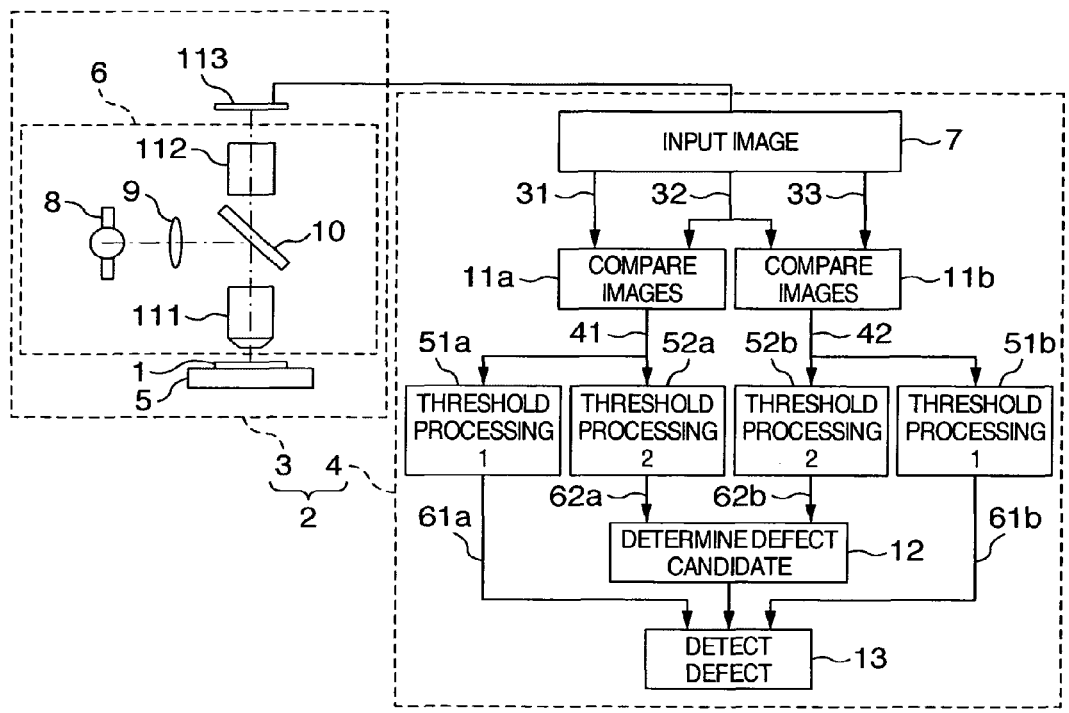
FIG. 1 is a diagram showing an example of the configuration of an inspection apparatus according to the invention.
Figure 2:
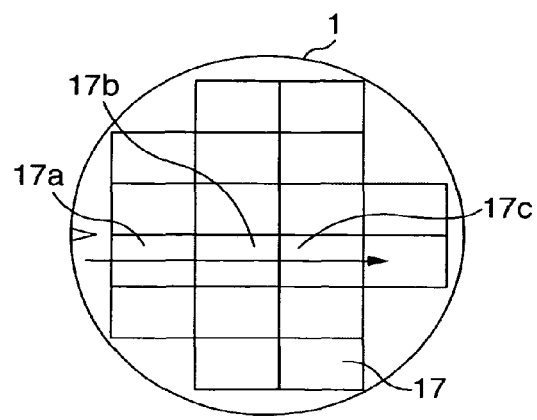
FIG. 2 is a plan view showing an example of an object to be inspected.

FIG. 1 is a diagram showing an example of the configuration of a visual inspection apparatus according to this invention. The object to be inspected 1 (hereinafter sometimes referred to as the object 1) is a semiconductor wafer having a plurality of chips 17 formed with the same wiring pattern such as shown in FIG. 2. The visual inspection apparatus 2 for inspecting the object 1 from the appearance thereof is roughly divided into an image data acquisition unit 3 for acquiring the image data of the object 1 and an image processing unit 4.

The image data acquisition unit 3 includes a stage 5 for holding and moving the object 1 in X, Y, Z and θ directions (direction of rotation around Z axis), an optical system 6 to project an image of the object 1 on the stage 5, and an imaging device 113 for converting the optical image formed by the optical system into image data.

The optical system 6 includes a light source 8, an illumination optics 9 for condensing the light from the light source 8, a beam splitter 10 for leading the light from the illumination optics 9 toward the object 1, an objective lens 111 and an imaging optics 112 for forming a magnified image of the object 1 by collecting the light reflected on the object 1. The light source 8 is formed of an incoherent light source such as a xenon lamp or an ultrahigh pressure mercury lamp or a laser. Although the light of the visible wavelength range is mainly used in the prior art, UV (ultraviolet) light or DUV (deep UV) light has also come to be used in recent years. The imaging device 113 includes a line sensor such as a TDI image sensor or an area sensor.

The image data picked up by the imaging device 113 is input to the image processing unit 4. The image processing unit 4 includes an image input unit 7 for receiving the image data, image comparators 11a, 11b for comparing two images sent from the image input unit 7, first threshold processing units 51a, 51b for processing the differential image data output from the image comparators 11a, 11b by a first threshold value, second threshold processing units 52a, 52b for processing the differential image data output from the image comparators 11a, 11b by a second threshold value, a defect candidate determining unit 12 for determining a defect candidate using the output of the second threshold processing units 52a, 52b, and a defect detection unit 13 for detecting a defect using the outputs of the defect candidate determining unit 12 and the first threshold processing units 51a, 51b.

Next, a method of inspecting the object 1 using the inspection apparatus 2 having the aforementioned configuration is explained. As shown in FIG. 1, a semiconductor wafer constituting the object 1 to be inspected is placed on the stage 5. The object 1 is formed with a plurality of chips 17 having the same wiring pattern. The image is picked up while moving the stage 5 in the direction opposite to the direction of arrow thereby to acquire the image data of the chips 17a, 17b, 17c.

The data of three images obtained in this way are input to the image processing unit 4. The input image data are sent to the image comparators 11a, 11b through the image input unit 7. One of the three image data 31, 32, 33 is sent to the image comparators 11a and 11b. The remaining two image data are input to the two image comparators 11a and 11b, respectively. Each of the image comparators 11a, 11b, after correcting the displacement of each of the input images, calculates the difference between the two images (hereinafter referred to as the differential image data) input thereto. Specifically, the differential image data 41 is acquired by subtracting the image data 32 from the image data 31 and the differential image data 42 by subtracting the image data 33 from the image data 32.

The two differential image data 41, 42 obtained in this way are sent to a pair of threshold processing units 51a, 52a and a pair of threshold processing units 51b, 52b, respectively. The threshold processing units 51a, 51b determine whether the pixel value of each pixel of the input differential image data exceeds a first threshold value or not. The threshold processing units 52a, 52b, on the other hand, determine whether the pixel value of each pixel of the input differential image data exceeds a second threshold value or not. The first threshold value is equivalent to the threshold value used in the prior art, while the second threshold value is lower than the first threshold value.

The differential image data 62a, 62b processed by the threshold values of the threshold processing units 52a, 52b are sent to the defect candidate determining unit 12. The defect candidate determining unit 12 determines a pixel associated with the input data 62a, 62b both higher than the respective threshold values as a defect candidate pixel. The information on the defect candidate obtained in this way is sent to the defect detection unit 13. The defect detection unit 13 determines the presence or absence of a defect based on the information on the defect candidate sent from the defect candidate determining unit 12 and the differential image data 61a, 61b processed by the threshold values of the threshold processing units 51a, 51b. Specifically, any of the defect candidate pixels sent from the defect candidate determining unit 12 which is determined as higher than the threshold value in the data 61a or 61b is determined as a defect.

Figure 3:
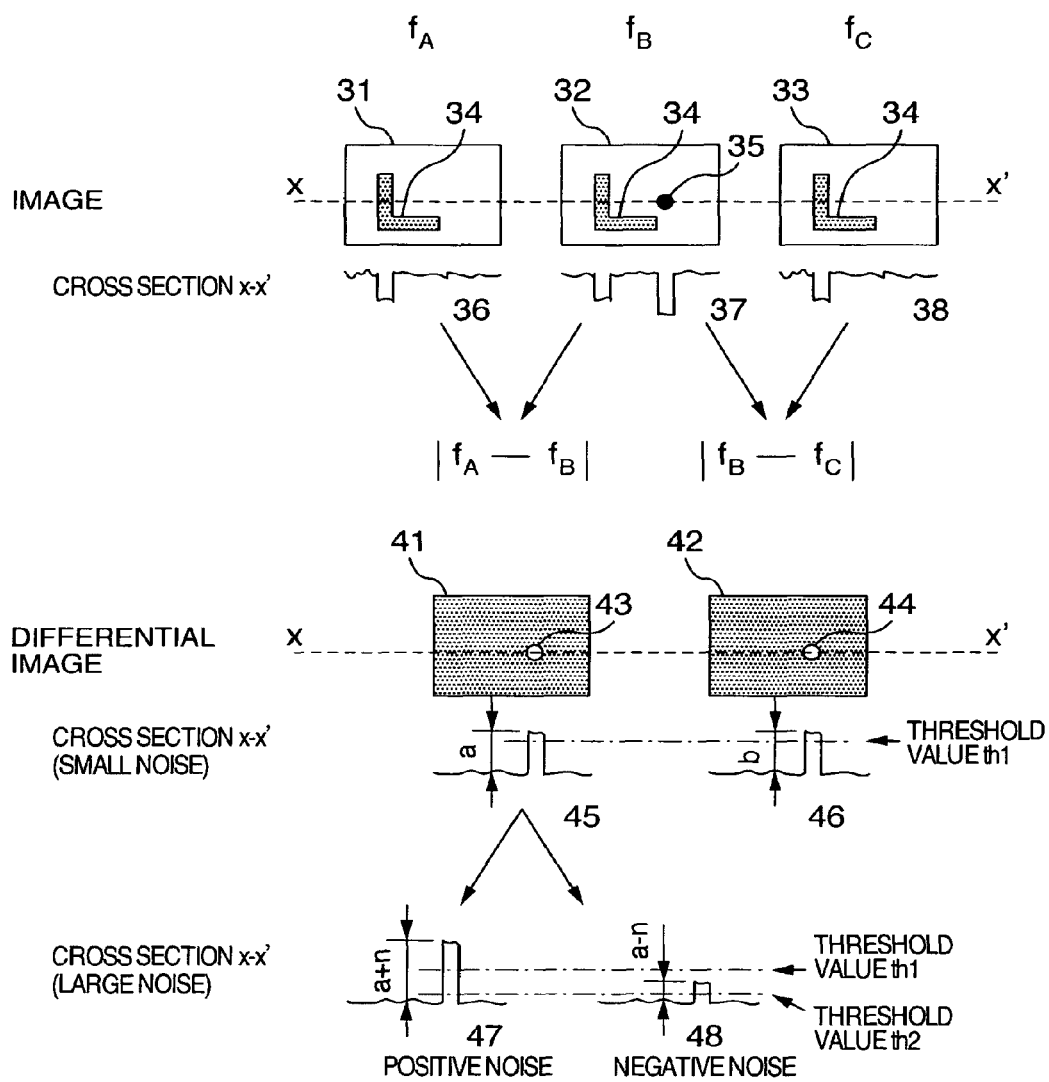
FIG. 3 is a diagram showing an example of processing the image data according to the invention.

Next, the reason why stable defect detection is possible by the invention is explained with reference to FIG. 3.

In the case under consideration, a pattern 34 is shared by images 31, 32, 33 sent to the image comparators 11a, 11b through the image input unit 7 (FIG. 1) and the image 32 contains an apparently dark defect 35. The signals of these images in the cross section x-x' through the defect 35 assume the forms as indicated by 36, 37, 38, respectively.

In the image comparator 11a, the image 32 is subtracted from the image 31, and from the absolute value of the resultant difference, a differential image 41 is generated. Similarly, in the image comparator 11b, the image 33 is subtracted from the image 32, and from the absolute value of the resultant difference, a differential image 42 is generated. The signals of these images 41, 42 in the cross section x-x' through the positions 43, 44 corresponding to the defect 35 assume the forms 45, 46, respectively. In these images, the positions 43, 44 of the image 32 corresponding to the defect 35 have a larger pixel value than the surrounding area. These pixel values are designated by "a" and "b", respectively.

The pixel values a and b of the defective part in the differential images 41, 42 undergo a change due to various factors. Specifically, they increase or decrease randomly with time due to the brightness change of the illumination light source 8 or the random noises of the imaging device 113 used for image acquisition. The manner in which the pixel values a and b change is schematically illustrated in the signal forms 47, 48 taking the signal form 45 of the differential image 41 as an example. In the case where the images 31 to 33 are blurred by the vibration of the stage during the acquisition thereof, the pixel value a or b is reduced.

As indicated by the signal forms 45, 46, the approximation of the pixel values a and b to a threshold value th1 may include three cases, i.e. a case in which both the pixel values a and b are higher than the threshold value, a case in which one of the pixel values a and b is higher than the threshold value and a case in which both the pixel values a and b are not higher than the threshold value, resulting in an unstable defect detection.

In view of this, according to this invention, a second threshold value th2 lower than the threshold value th1 (the first threshold value) used in the prior art is created. The second threshold value th2, as shown in the example signal forms 47, 48, is set to a level always exceeded by the pixel values a and b even in the case where the pixel value of the defective part of the differential image is reduced by the noise of the imaging device 113 or the vibration of the stage 5. By doing so, such a defect is always picked up as a defect candidate in the defect candidate determining unit 12 (FIG. 1).

The determination based solely on a low threshold value (second threshold value), however, would increase the chance that the brightness change due to the random noise in the image presents itself as a defect candidate. According to this invention, therefore, the defect detection unit 13 finally determines the presence or absence of a defect by referring to the result 61a, 61b of processing the pixel values a and b using the first threshold value for the part cited as a defect candidate by the defect candidate determining unit 12. Specifically, only in the case where at least one of the pixel values a and b for the part picked up as a defect candidate by the defect candidate determining unit 12 is higher than the first threshold value, the particular part is determined as a defect.

This defect detection method makes it possible to detect a defect in the aforementioned manner and improve the defect detection stability except for the last one of the already cited three cases, i.e. the case in which "both the pixel values a and b are higher than the first threshold value", the case in which "one of the pixel values a and b is higher than the first threshold value" and the case in which "both pixel values a and b are not higher than the first threshold value".

This invention is applicable to the method not taking the absolute value of the difference of images. In such a case, positive threshold and negative threshold would be necessary in conventional method. The method described above is applicable to the positive threshold without any change. Also the method is applicable to the negative threshold by choosing the absolute value of the first threshold value higher than the that of the second threshold value.

The embodiment described above refers to a method of detecting a defect by die-to-die comparison taking the semiconductor wafer inspection as an example. Nevertheless, this invention is applicable also to the defect detection by cell-to-cell comparison.

Figure 4:
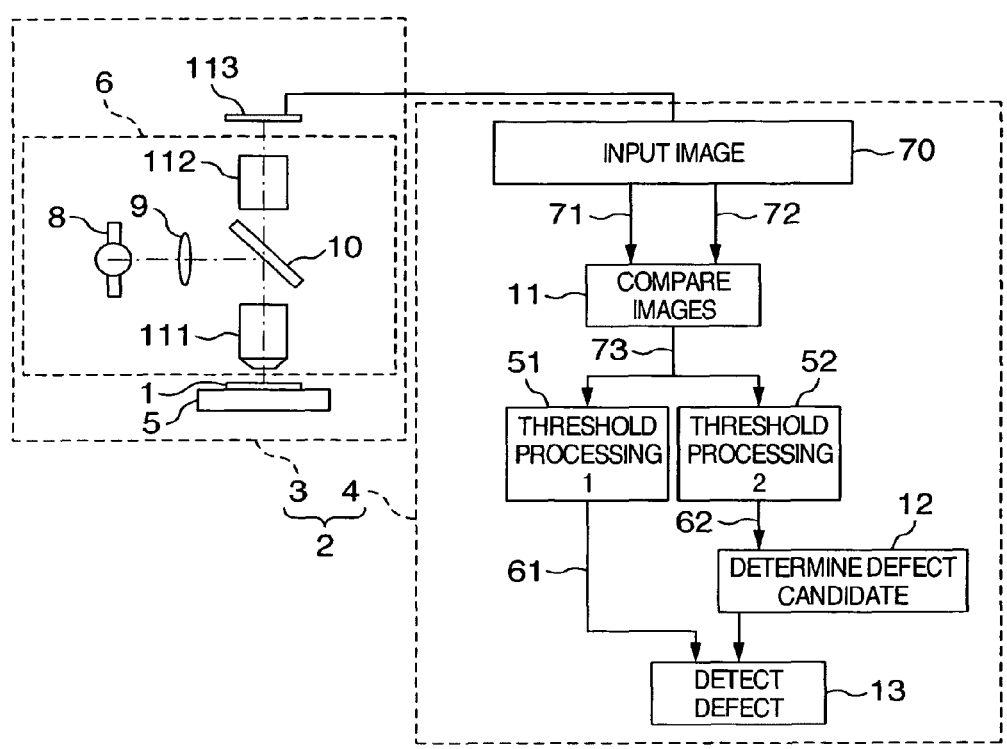
FIG. 4 is a diagram showing another example of the configuration of the inspection apparatus according to the invention.

FIG. 4 is a diagram showing an example of the configuration of the inspection apparatus according to this invention using the cell-to-cell comparison. An image of the part of the object 1 having a repetitive pattern structure is input from the imaging device 113 of the image data acquisition unit 3 to the image input unit 70 of the image processing unit 4. In the image input unit 70, the input image data 71 is input to the image comparator 11 while at the same time generating an image shifted from the input image by an amount equal to an integer multiple of the repetition period, and the resultant image is input to the image comparator 11 as an image data 72.

In the image comparator 11, the image 72 is subtracted from the image 71 and from the absolute value of the difference, a differential image 73 is generated. The differential image 73 thus obtained is processed by the first threshold value and the second threshold value lower than the first threshold value in the threshold processing units 51, 52, respectively. The differential image data 62 processed by the threshold value in the threshold processing unit 52 is sent to the defect candidate determining unit 12. In the presence of a single defect, the differential image develops two peaks separate from each other by the distance equal to the displacement of the image. As long as the two peaks appearing at the positions separate from each other by the distance equal to the image displacement are both higher than the second threshold value, therefore, the defect candidate determining unit 12 determines the corresponding pixel as a defect candidate pixel. The information on the defect candidate is sent to the defect detection unit 13. The defect detection unit 13 determines the presence or absence of a defect based on the information on the defect candidate sent from the defect candidate determining unit 12 and the differential image data 61 processed by the threshold values in the threshold determining unit 51. Specifically, in the case where any one of the two peaks sent from the defect candidate determining unit 12 exceeds the first threshold value, the corresponding pixel is determined as a defect. In this way, a defect is detected on condition that two peaks both exceed the second threshold value and one of them exceeds the first threshold value. As compared with the case in which only the first threshold value is used for defect detection, therefore, stable defect detection is made possible.

As described above, in the case where the defect signal level in the differential image is slightly higher than the threshold value, the provision of the single threshold value (first threshold value) as in the prior art may give rise to a case in which a defect cannot be detected by the effect of a noise or the like. According to this invention, in contrast, the simultaneous use of the second threshold value lower than the first threshold value and the condition that at least one of the two peaks appearing in the differential image due to a defect is higher than the first threshold value make possible stable detection free of the effect of noises.

The defect detection method according to this invention is not limited to the semiconductor wafer but applicable also to the inspection of an object having a repetitive pattern or the comparison test of the appearance of a plurality of individual entities. Also, in addition to the case of acquiring an optical image of an object as in the embodiments described above, the defect detection method according to the invention is applicable to the inspection based on an image acquired using an electron beam with equal effect. Further, although the image data is processed by hardware in the embodiment of the invention described above, the defect detection method according to the invention is usable also for processing the whole or a part of the image data with software.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A defect inspection apparatus, comprising:
an image acquisition unit having an image sensor and configured to acquire first, second and third images of an object, the object being a semiconductor wafer having a plurality of chips formed with a same wiring pattern, to be inspected; and
a processing unit coupled to receive the first, second and third images from the image acquisition unit,
wherein the processing unit is configured to:
obtain, in a first image comparator, a first differential image by subtracting the second image from the first image;
obtain, in a second image comparator, a second differential image by subtracting the third image from the second image;
process the first differential image with a first threshold value to determine whether a pixel value of each pixel of the first differential image exceeds the first threshold value or not;
process the first differential image with a second threshold value to determine whether a pixel value of each pixel of the first differential image exceeds the second threshold value or not, wherein the second threshold value is lower than the first threshold value and is set to a level exceeded by a reduced pixel value indicating a potential defect, the reduced pixel value being a pixel value reduced by at least one of a noise of an imaging device and vibration of a stage;
process the second differential image with the first threshold value to determine whether a pixel value of each pixel of the second differential image exceeds the first threshold value or not;
process the second differential image with the second threshold value to determine whether a pixel value of each pixel of the second differential image exceeds the second threshold value or not;
determine pixels whose pixel values exceed the second threshold value in both the first and second differential images, as defect candidates; and
determine a presence or absence of a defect based on a result of the determination of the defect candidates, by determining pixels, among the determined defect candidates, whose pixel values are higher than the first threshold value in at least one of the first and second differential images, as the defect.

2. An image processing system, comprising:
an image acquisition unit having an image sensor and configured to acquire first, second and third images of an object, the object being a semiconductor wafer having a plurality of chips formed with a same wiring pattern, to be inspected; and
a processing unit coupled to receive the first, second and third images from the image acquisition unit,
wherein the processing unit is configured to:
obtain, in a first image comparator, a first differential image by subtracting the second image from the first image;
obtain, in a second image comparator, a second differential image by subtracting the third image from the second image;
process the first differential image with a first threshold value to determine whether a pixel value of each pixel of the first differential image exceeds the first threshold value or not;
process the first differential image with a second threshold value to determine whether a pixel value of each pixel of the first differential image exceeds the second threshold value or not, wherein the second threshold value is lower than the first threshold value and is set to a level exceeded by a reduced pixel value indicating a potential defect, the reduced pixel value being a pixel value reduced by at least one of a noise of an imaging device and vibration of a stage;
process the second differential image with the first threshold value to determine whether a pixel value of each pixel of the second differential image exceeds the first threshold value or not;
process the second differential image with the second threshold value to determine whether a pixel value of each pixel of the second differential image exceeds the second threshold value or not;

determine pixels whose pixel values exceed the second threshold value in both the first and second differential images, as defect candidates; and determine a presence or absence of a defect based on a result of the determination of the defect candidates, by determining pixels, among the determined defect candidates, whose pixel values are higher than the first threshold value in at least one of the first and second differential images, as the defect.

3. A defect inspection method for inspecting an object, the object being a semiconductor wafer having a plurality of chips formed with a same wiring pattern, the method comprising the steps of:

acquiring first, second and third images of the object to be inspected;

obtaining a first differential image by subtracting the second image from the first image;

obtaining a second differential image by subtracting the third image from the second image;

processing the first differential image with a first threshold value to determine whether a pixel value of each pixel of the first differential image exceeds the first threshold value or not;

processing the first differential image with a second threshold value to determine whether a pixel value of each pixel of the first differential image exceeds the second threshold value or not, wherein the second threshold value is lower than the first threshold value and is set to a level exceeded by a reduced pixel value indicating a potential defect, the reduced pixel value being a pixel value reduced by at least one of a noise of an imaging device and vibration of a stage;

processing the second differential image with the first threshold value to determine whether a pixel value of each pixel of the second differential image exceeds the first threshold value or not;

processing the second differential image with the second threshold value to determine whether a pixel value of each pixel of the second differential image exceeds the second threshold value or not;

determining pixels whose pixel values exceed the second threshold value in both the first and second differential images, as defect candidates; and determining a presence or absence of a defect based on a result of the determination of the defect candidates, by determining pixels, among the determined defect candidates, whose pixel values are higher than the first threshold value in at least one of the first and second differential images, as the defect.

* * * * *